United States Patent
Jeanneau et al.

(10) Patent No.: US 9,680,198 B2
(45) Date of Patent: Jun. 13, 2017

(54) LIGHTNING PROTECTION SYSTEM FOR RADOME AND ASSOCIATED ASSEMBLY METHOD

(71) Applicant: Airbus Operations (SAS), Toulouse (FR)

(72) Inventors: Charlotte Jeanneau, Levignac (FR); Christophe Bernus, Toulouse (FR); Thony Dupas, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 424 days.

(21) Appl. No.: 14/105,568

(22) Filed: Dec. 13, 2013

(65) Prior Publication Data

US 2014/0168018 A1   Jun. 19, 2014

(30) Foreign Application Priority Data

Dec. 14, 2012 (FR) ..................... 12 62065

(51) Int. Cl.
| | |
|---|---|
| *H01Q 1/00* | (2006.01) |
| *B64D 45/02* | (2006.01) |
| *H01Q 1/28* | (2006.01) |
| *H01Q 1/42* | (2006.01) |
| *H01Q 1/50* | (2006.01) |

(52) U.S. Cl.
CPC ............. *H01Q 1/002* (2013.01); *B64D 45/02* (2013.01); *H01Q 1/28* (2013.01); *H01Q 1/281* (2013.01); *H01Q 1/42* (2013.01); *H01Q 1/50* (2013.01); *Y10T 29/49018* (2015.01)

(58) Field of Classification Search
CPC ......... H01Q 1/002; H01Q 1/281; B64D 45/02
USPC ........................................... 343/711
See application file for complete search history.

(56) References Cited

U.S. PATENT DOCUMENTS

| | | | |
|---|---|---|---|
| 3,576,581 A | 4/1971 | Tricoles et al. | |
| 4,796,153 A | 1/1989 | Amason et al. | |
| 5,542,624 A * | 8/1996 | Smith ..................... | H02G 13/00 244/1 A |
| 7,623,073 B2 * | 11/2009 | Teshirogi ................. | H01Q 1/38 343/700 MS |
| 7,765,864 B2 * | 8/2010 | Bernus ...................... | B64C 1/36 361/124 |
| 8,130,167 B2 * | 3/2012 | Glabe ...................... | H01Q 1/42 343/705 |

(Continued)

FOREIGN PATENT DOCUMENTS

| | | |
|---|---|---|
| FR | 2727784 | 6/1996 |
| FR | 2924686 | 6/2009 |

(Continued)

OTHER PUBLICATIONS

French Search Report, Jun. 28, 2013.

*Primary Examiner* — Dameon E Levi
*Assistant Examiner* — Walter Davis
(74) *Attorney, Agent, or Firm* — Greer, Burns & Crain Ltd.

(57) ABSTRACT

A lightning protection system for a radome, the system comprising at least one lightning protection strip positioned on an inner wall of the radome, wherein the lightning protection strip defines, on the inner wall of the radome, a curve that is substantially perpendicular, at all points thereof, to the polarization direction of the electrical field vector radiated by an antenna across from the inner wall of the radome.

12 Claims, 6 Drawing Sheets

(56) References Cited

U.S. PATENT DOCUMENTS 8,462,481 B2 6/2013 Lambert et al.
2010/0276536 A1* 11/2010 Lambert ................ H02G 13/00
 244/1 A
2010/0276538 A1* 11/2010 Helou, Jr. ............... B64C 39/02
 244/118.1

FOREIGN PATENT DOCUMENTS

FR 2970569 7/2012
GB 2295594 6/1996

* cited by examiner

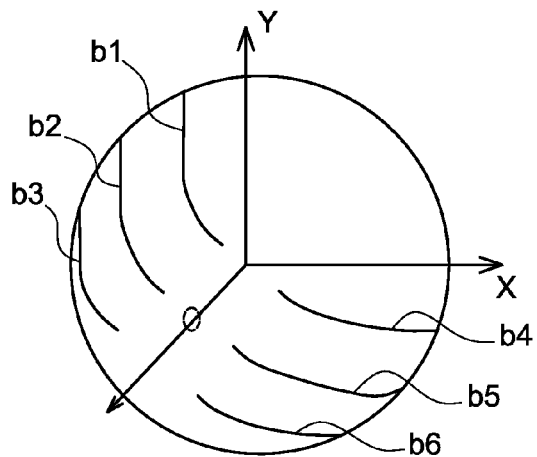 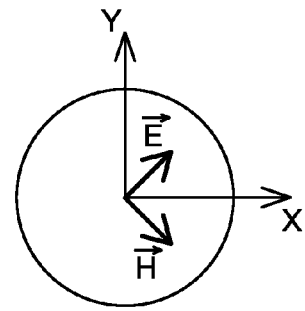
FIG. 4a  FIG. 4b
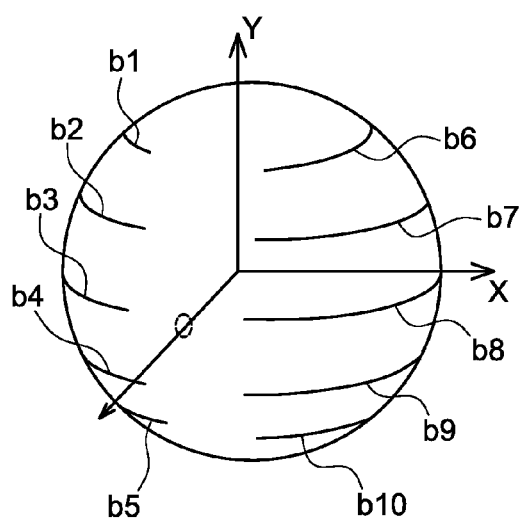 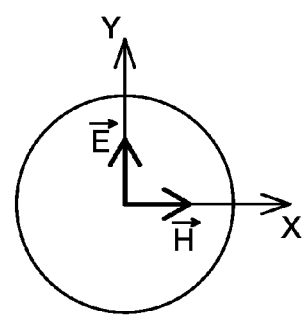
FIG. 5a  FIG. 5b

LIGHTNING PROTECTION SYSTEM FOR RADOME AND ASSOCIATED ASSEMBLY METHOD

CROSS-REFERENCES TO RELATED APPLICATIONS

This application claims the benefit of the French patent application No. 12 62065 filed on Dec. 14, 2012, the entire disclosures of which are incorporated herein by way of reference.

BACKGROUND OF THE INVENTION

The invention relates to a lightning protection system for a radome as well as a method for assembling the lightning protection system on a radome.

The invention is particularly advantageously applicable to aircraft radomes.

Lightning may cause significant damage to aircraft during flight. In order to protect aircraft and minimize the damage that may be caused by lightning, it is known to place strips protecting against lightning on the radome of the aircraft.

A first known system for protecting against lightning is made up of metal strips positioned on the outer face of the radome. FIG. 1 illustrates this device. In order to minimize aerodynamism problems, the metal strips b are positioned radially on the outer face of the radome, starting from the periphery of the radome and targeting the tip P thereof. The metal strips are electrically connected to the ground of the aircraft. When lightning strikes the radome, the metal strips b guide the lightning to the ground of the aircraft.

In order to eliminate the aerodynamism problem, a system is known from the prior art in which the metal strips are positioned inside the radome, and the metal strips are attached on the radome using metal studs that are flush with the outer wall of the radome. Such a system is described in the French patent application filed by the Applicant dated Dec. 11, 2007, under no. 07 59733 and entitled "Système parafoudre et aéronef comportant un tel système." Out of a concern for symmetry and connection of the metal strips to the fuselage of the aircraft, the latter are positioned radially on the inner face of the radome. FIG. 2 illustrates the connection between a metal stud 1 that is flush with the outer wall of the radome and a lightning protection strip b situated on the inner face of the radome. The metal stud 1 is fastened in the wall of the radome R using a spacer EN, and the metal strip b is screwed to the metal stud 1. The lightning F that strikes the metal stud 1 on the side of the outer wall 2 of the radome is then guided to the strip b situated on the side of the inner wall 3 of the radome.

Although this second device makes it possible to resolve the aerodynamism problem, the position of the metal strips continues to disrupt the radiation emitted by the antenna. In fact, due to the presence of the metal strips b positioned radially on the inner face of the radome, the total energy emitted in the far range is lower than the total energy that would be emitted without strips. Likewise, the radiation pattern is also disrupted relative to the pattern that would be obtained without strips.

The invention does not have the aforementioned drawbacks.

SUMMARY OF THE INVENTION

The invention relates to a lightning protection system for an antenna radome, the antenna being able to radiate toward an inner wall of the radome an electrical field having a predetermined rectilinear polarization direction, the system comprising at least one lightning protection strip positioned on an inner wall of the radome, characterized in that the lightning protection strip defines, on the inner wall of the radome, a curve that is substantially perpendicular, at each of its points, to the predetermined rectilinear polarization direction of the electrical field vector.

In the context of the invention, the expression "substantially perpendicular" must be understood, for example, as being perpendicular to within 25° more or less.

According to an additional feature of the invention, the curve defined by the lightning protection strip is substantially perpendicular to a set of segments, each segment of the set of segments corresponding, for a misalignment of the antenna, to a projection, on the inner wall of the radome, in a direction perpendicular to a plane that contains the antenna, of a straight line segment centered on a central radiating rectilinear element of the antenna and having a direction parallel to the predetermined polarization direction of the electrical field vector that can be radiated by said central radiating rectilinear element, the set of segments being determined for multiple misalignments of the antenna.

According to another additional feature of the invention, the curve defined by the lightning protection strip is substantially perpendicular to at least one additional segment that is an extension, toward the periphery of the radome and as far as a point situated near a contour that delimits a lighting zone of the radome, of a projected segment that corresponds to an abutment of the antenna, the extension of said segment corresponding to an intersection between the inner wall of the radome and a plane that comprises the straight segment centered on said rectilinear element and said projected segment.

According to still another additional feature of the invention, the lightning protection strip is connected to an electrical ground situated beyond the contour that delimits the lighting zone of the radome.

According to still another additional feature of the invention, the multiple misalignments of the antenna encompass the entire radio slot of the antenna.

The invention also relates to a device comprising a radome and an antenna capable of radiating, toward an inner wall of the radome, an electrical field having a predetermined rectilinear polarization direction, the radome being provided with a lightning protection system, characterized in that the lightning protection system is a system according to the invention.

The invention also relates to an aircraft comprising a device including a radome and an antenna capable of radiating, toward an inner wall of the radome, an electrical field having a predetermined rectilinear polarization direction, characterized in that the device is a device according to the invention.

The invention also relates to a method for assembling a lightning protection system on an inner wall of a radome, the antenna being capable of radiating, toward the inner wall of the radome, an electrical field having a predetermined rectilinear polarization direction, the method comprising assembling at least one lightning protection strip on the inner wall of the radome, characterized in that the assembly of the lightning protection strip is done such that said strip follows a curve that is substantially perpendicular, at each of its points, to the predetermined rectilinear polarization direction of the electrical field vector.

According to one additional feature of the inventive method:

the set of segments is determined, each segment of the set of segments being determined, for a misalignment of the antenna, by a projection, on the inner wall of the radome, in a direction perpendicular to a plane that contains the antenna, of a straight line segment centered on a central radiating rectilinear element of the antenna and having a direction parallel to the predetermined rectilinear polarization direction of the electrical field vector that can be radiated by said central radiating rectilinear element, the set of segments being determined for multiple misalignments of the antenna, and the lightning protection strip is positioned on the inner wall of the radome such that the segments intercepted by said strip are intercepted substantially perpendicularly.

According to one additional feature of the inventive method:

the determination of the set of segments further comprises, for the misalignments that abut the antenna, an extension of the segment projected toward the periphery of the radome as far as a point situated near a contour that delimits a lighting area of the radome, the extension of the segment corresponding to an intersection between the inner wall of the radome and a plane that comprises the straight segment centered on the rectilinear element and the projected segment, and the lightning protection strip is extended on the inner wall of the radome such that a projected segment that results from the extension is intercepted substantially perpendicularly by said strip.

BRIEF DESCRIPTION OF THE DRAWINGS

Other features and advantages of the invention will appear upon reading one preferred embodiment thereof in reference to the appended figures, in which:

FIGS. 4A-4B, 5A-5B and 6A-6B symbolically illustrate three lightning protection systems according to the invention respectively corresponding to three different rectilinear polarizations of the radiated electromagnetic wave;

In all of the figures, the same references designate the same elements.

DETAILED DESCRIPTION OF THE PREFERRED EMBODIMENTS

Figure 3:
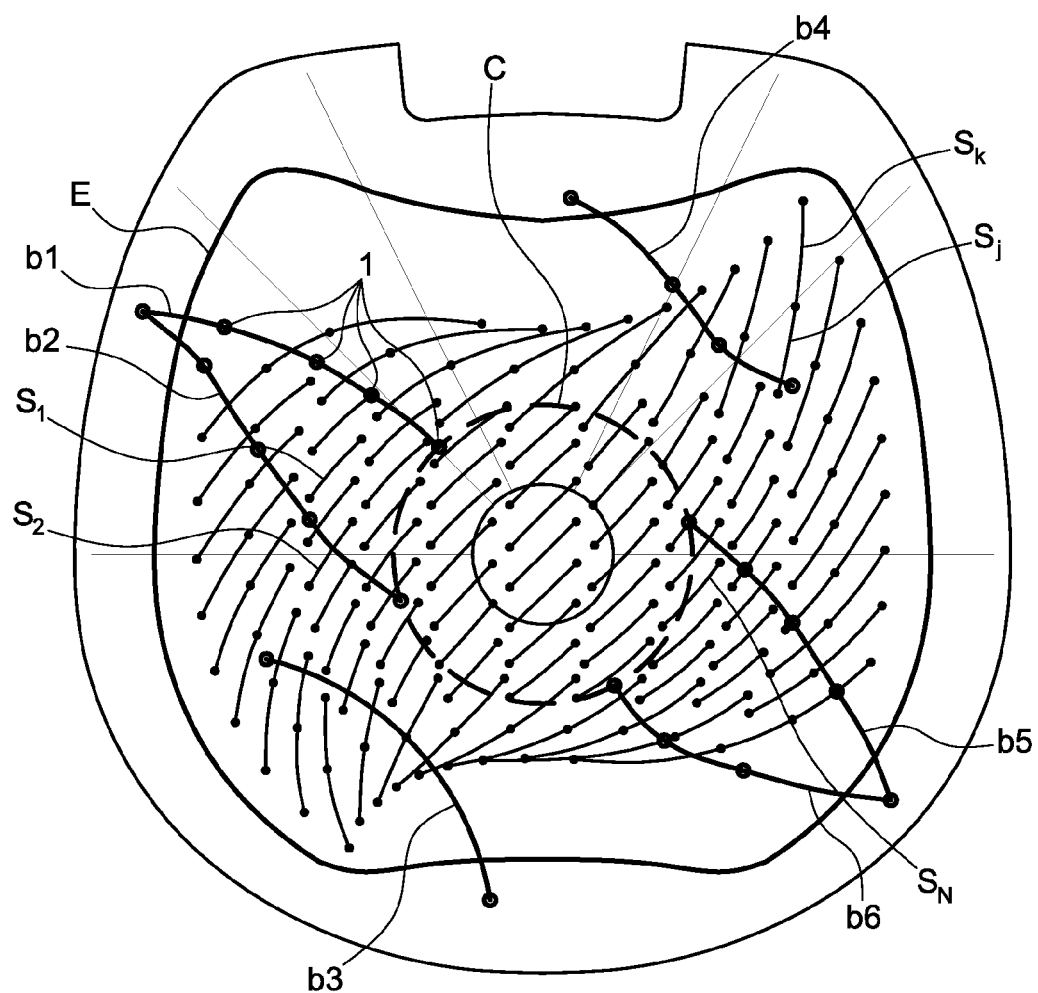
FIG. 3 shows, as a non-limiting example, a front view of the inner wall of a radome equipped with a lightning protection system according to the invention.

FIG. 3 shows, as a non-limiting example, a front view of the inner wall of a radome equipped with a lightning protection system according to the invention.

The lightning protection system according to the invention comprises six metal strips b1-b6 distributed on the inner wall of the radome. Each lightning protection strip defines a curve that is substantially perpendicular, at all of its points, to the rectilinear polarization direction of the electrical field vector radiated by an antenna that faces the radome. According to the selected example, the antenna that faces the radome (not shown in the figure) is a flat plate antenna that radiates an electromagnetic wave whereof the electrical field is polarized rectilinearly at 45°. The polarization direction of the electrical field vector radiated by the antenna is shown symbolically by the segments S1, S2, . . . , Sj, . . . , SN, the construction of which is outlined in reference to FIGS. 7A-7B of the present description.

Figure 1:
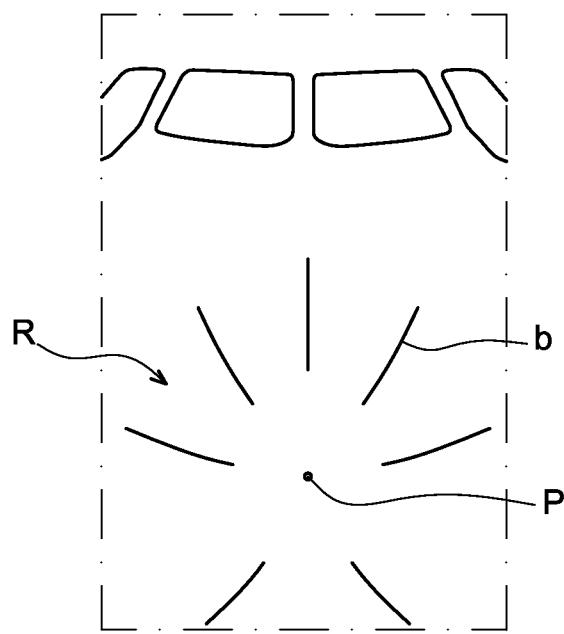
FIG. 1, already described, shows a first lightning protection system according to the prior art.
Figure 2:
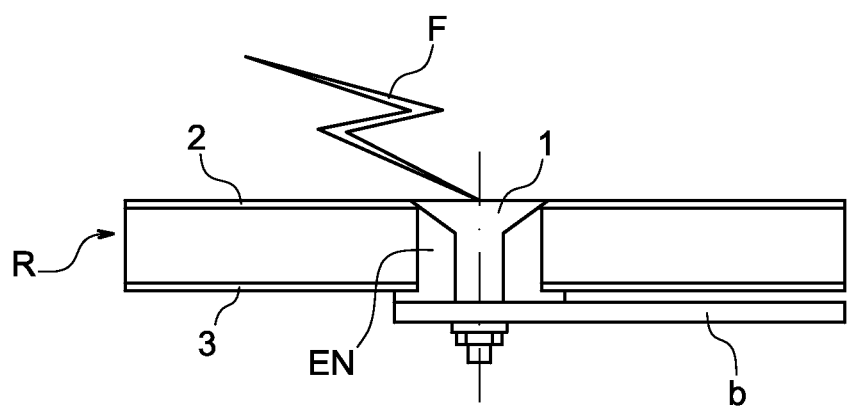
FIG. 2, already described, shows a detailed view of a second lightning protection system according to the prior art.

Each lightning protection strip is connected to the outside of the radome by a set of metal studs 1 as previously described in reference to FIG. 2. The lighting zone of the inner wall of the radome is delimited by the closed curve E. Beyond the curve E, each lightning protection strip is connected to the ground of the aircraft. In a manner also known in itself, the centermost part of the radome has no lightning protection strip (zone of the radome inside the circle C shown in FIG. 3).

FIGS. 4A-4B, 5A-5B and 6A-6B symbolically illustrate three lightning protection systems according to the invention respectively corresponding to three different rectilinear polarizations of the radiated electromagnetic wave.

FIGS. 4A-4B symbolically illustrate the case shown in detail by FIG. 3 and which corresponds to a radiated wave polarized at 45°. FIG. 4A illustrates the position of the lightning protection strips on the inner wall of the radome, and FIG. 4B illustrates the configuration of the corresponding electromagnetic field radiated by the antenna.

FIGS. 5A-5B symbolically illustrate the case of a vertically polarized radiated wave. FIG. 5A illustrates the position of lightning protection strips on the inner wall of the radome and FIG. 5B illustrates the configuration of the corresponding electromagnetic field radiated by the antenna.

Figure 6A:
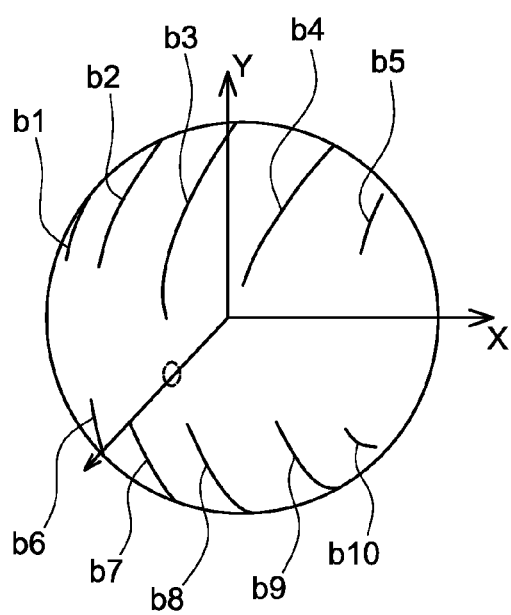
Figure 6B:
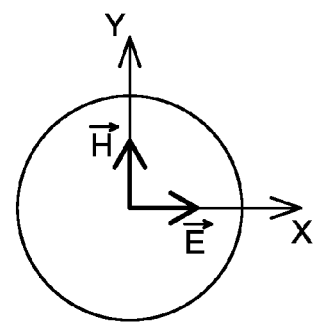

FIGS. 6A-6B symbolically illustrate the case of a horizontally polarized radiated wave. FIG. 6A illustrates the position of lightning protection strips on the inner wall of the radome and FIG. 6B illustrates the configuration of the corresponding electromagnetic field radiated by the antenna.

All of the figures show a positioning of the lightning protection strip substantially perpendicular to the direction of the radiated electrical field vector.

Creating a relationship, according to the invention, between the orientation of the lightning protection strips and the rectilinear polarization direction of the electrical field of the wave radiated by the antenna has many advantages. In fact, creating that relationship results in a significant decrease in the loss of transparency of the radome, for example a decrease of approximately 3%. It is then possible to obtain range and sensitivity gains in the detection of meteorological phenomena. Creating this relationship also results in a significant decrease in the deformation of the beam emitted by the antenna, thereby causing a drop, for example of 3 dB, in the rises of the level of the side lobes generated by the presence of the radome. The reliability of the meteorological detection is thus improved for example by preventing any reflections of the side lobes on a cloud not located in the axis of the antenna from being taken into account. Likewise, the influence of ground echoes is decreased, which improves the quality of the received signal and decreases the likelihood of false alerts on the windshear detection system, or PWS (Predictive WindShear system). Additionally, the axis deviation of the beam is decreased, thereby favoring the precision of mapping or target monitoring systems.

Figure 7A:
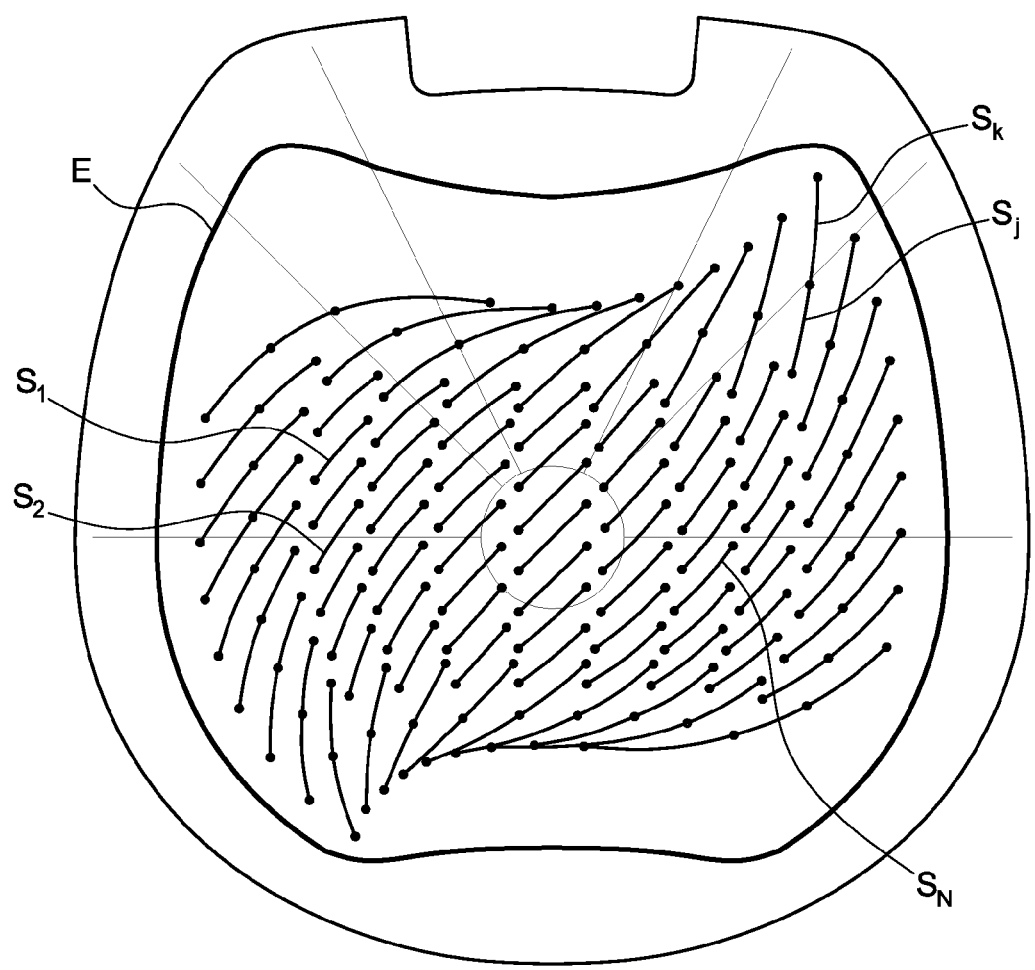
FIGS. 7A and 7B show, as a non-limiting example, geometric figures suitable for the placement of the lightning protection system shown in FIG. 3.
Figure 7B:
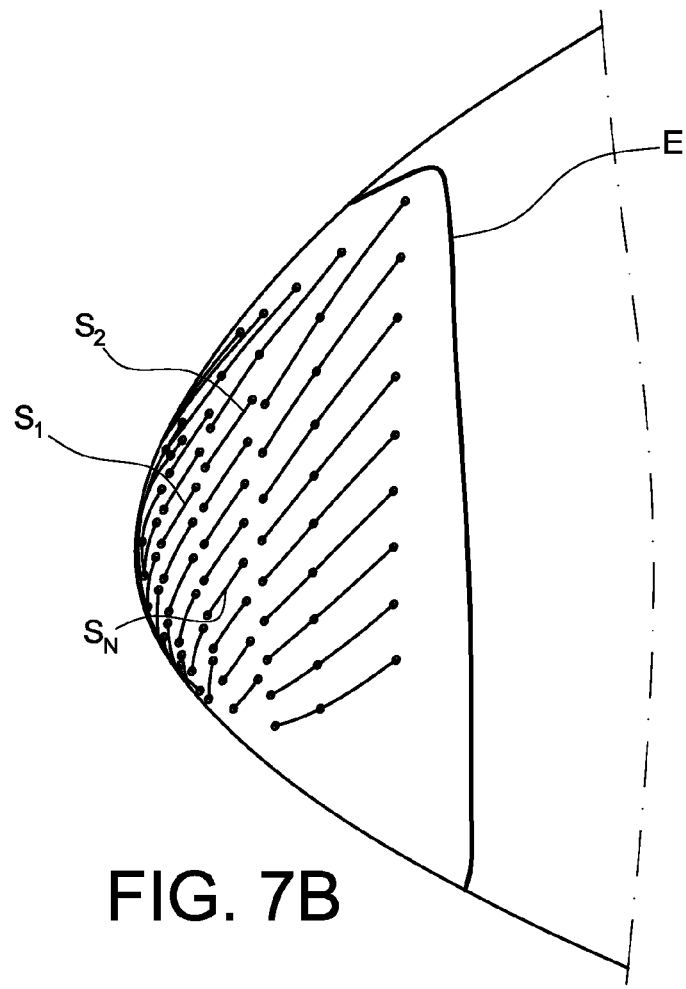

FIGS. 7A and 7B respectively show, as non-limiting examples, a front view and a transverse cross-sectional view of the inner wall of a radome on which a geometric figure is shown that is capable of assisting with positioning of the lightning protection strips, according to the example shown in FIG. 3.

Figure 8:
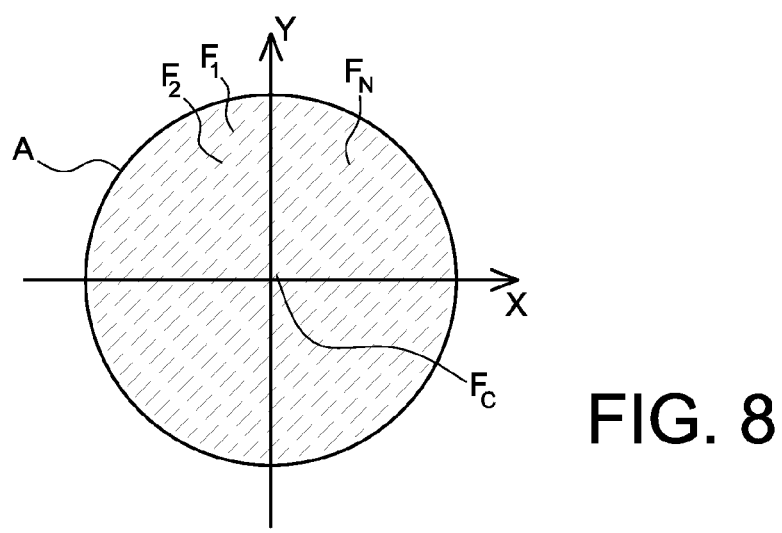
FIG. 8 shows a radar antenna panel suitable for the design of the geometric figures shown in FIGS. 7A and 7B.

The electromagnetic wave radiated toward the radome is a wave whereof the electrical field is polarized rectilinearly at 45°. FIG. 8 illustrates a front view of a radar antenna panel that radiates such a wave. The surface of the antenna defines a circle centered in an orthogonal reference (X, Y), the axes X and Y being substantially combined with a horizontal and a vertical when the aircraft is on the ground. The antenna is capable of moving around each of the axes X and Y (azimuthal rotation around the axis Y and elevation rotation around the axis Y). The antenna is provided with a set of slits F1, F2, ..., FN etc. oriented at 45° in the reference (X, Y). Among these slits, a central slit FC passes through the center of the circle defined by the panel. The polarization of the radiated electrical field is rectilinear. Each slit radiates an electromagnetic wave whereof the electrical field has a direction perpendicular to the axis of the slit.

The geometric figure of FIG. 7A shows a front view of a set of segments Si (i=1, 2, ..., N) distributed on the inner wall of the radome. These segments fit into the closed curve E that delimits the lighting zone of the inner wall of the radome for all possible misalignments of the antenna.

For a given antenna misalignment, a segment Si corresponds to a projection, on the inner wall of the radome and in a direction perpendicular to a plane that contains the surface of the antenna, of a straight line segment centered on the central rectilinear element FC and having a direction parallel to the polarization direction of the electrical field vector radiated by said central radiating rectilinear element. For an antenna with a diameter equal to 70 cm, the length of the straight line segment centered on the central rectilinear element is for example chosen to be equal to 15 cm. Other values, however, are possible, for example 10 cm or 20 cm. The centered straight line segment is projected on the central rectilinear element for multiple misalignments of the antenna including the zero misalignment (projection in the axis of the antenna), and the misalignments that abut the antenna. Preferably, the multiple misalignments of the antenna encompass the entire radio slot of the antenna.

According to the invention, the projected segments that correspond to cases where the antenna is in abutment are extended toward the periphery of the radome. The extension of the projected segment then corresponds to the intersection between the inner wall of the radome and a plane that comprises the straight line segment centered on the rectilinear element and the projected segment. In reference to FIG. 7A, the projected segment Sk thus extends the projected segment Sj.

Once the geometry of the segments Si is established, a metal strip is assembled on the inner face of the radome by attaching the layout points chosen such that the curve drawn by those points is substantially perpendicular to the segments it intercepts. The distance that separates two successive layout points is for example equal to 20 cm in curvilinear distance. A certain number of passage points between the outside and the inside of the radome are also outlined for the passage of screws intended to fasten the metal strip. The metal strip may either be rigid (and therefore have previously been given the appropriate shape), or may be flexible to better conform to the desired shape.

In the preceding description, the invention has more particularly been described for a radome application onboard an aircraft. More generally, however, the invention applies to any type of radome associated with an antenna, irrespective of whether it is onboard.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A lightning protection system for an antenna radome, the antenna being able to radiate, toward an inner wall of the radome, electrical field having a predetermined rectilinear polarization direction, the system comprising: at least one lightning protection strip positioned on an inner wall of the radome, the lightning protection strip defining, on the inner wall of the radome, a curve, such that at any point on the curve, the curve is substantially perpendicular, to the electrical field radiated by the antenna as the electrical field intersects the curve at each of those points.

2. The system according to claim 1, wherein the curve defined by the lightning protection strip is substantially perpendicular to a set of segments ($S_1, S_2, \ldots, S_N$), each segment of the set of segments corresponding, for a misalignment of the antenna, to a projection, on the inner wall of the radome, in a direction perpendicular to a plane that contains the antenna, of a straight line segment centered on a central radiating rectilinear element ($F_C$) of the antenna and having a direction parallel to the predetermined polarization direction of the electrical field vector that can be radiated by said central radiating rectilinear element, the set of segments being determined for multiple misalignments of the antenna.

3. The system according to claim 2, wherein the curve defined by the lightning protection strip is substantially perpendicular to at least one additional segment that is an extension, toward the periphery of the radome and as far as a point situated near a contour that delimits a lighting zone of the radome, of a projected segment that corresponds to an abutment of the antenna, the extension of said segment corresponding to an intersection between the inner wall of the radome and a plane that comprises the straight segment centered on said rectilinear element and said projected segment.

4. The system according to claim 3, wherein the lightning protection strip is connected to an electrical ground situated beyond the contour that delimits the lighting zone of the radome.

5. The system according to claim 2, wherein the multiple misalignments of the antenna encompass the entire radio slot of the antenna.

6. A device comprising a radome and an antenna capable of radiating, toward an inner wall of the radome, an electrical field having a predetermined rectilinear polarization direction, the radome being provided with a lightning protection system, wherein the lightning protection system is a system according to claim 1.

7. An aircraft comprising a device including a radome and an antenna capable of radiating, toward an inner wall of the radome, an electrical field having a predetermined rectilinear polarization direction, wherein the device is a device according to claim 6.

8. A method for assembling a lightning protection system on an inner wall of a radome, an antenna interior of the radome being capable of radiating, toward the inner wall of the radome, an electrical field having a predetermined rectilinear polarization direction, the method comprising:

assembling at least one lightning protection strip on the inner wall of the radome, wherein the assembly of the lightning protection strip is done such that said strip follows a curve, such that at any point on the curve, the curve is substantially perpendicular, to the electrical field radiated by the antenna as the electrical field intersects the curve at each of those points.

9. The assembly method according to claim 8, including the step of determining a set of segments, each segment of the set of segments being determined, for a misalignment of the antenna, by a projection, on the inner wall of the radome, in a direction perpendicular to a plane that contains the antenna, of a straight line segment centered on a central radiating rectilinear element of the antenna and having a direction parallel to the predetermined rectilinear polarization direction of the electrical field vector that can be radiated by said central radiating rectilinear element, the set of segments being determined for multiple misalignments of the antenna, the lightning protection strip being positioned on the inner wall of the radome such that the segments intercepted by said strip are intercepted substantially perpendicularly.

10. The assembly method according to claim 9, wherein the determination of the set of segments further comprises, for the misalignments that abut the antenna, an extension of the segment projected toward the periphery of the radome as far as a point situated near a contour that delimits a lighting area of the radome, the extension of the segment corresponding to an intersection between the inner wall of the radome and a plane that comprises the straight segment centered on the rectilinear element and the projected segment, the lightning protection strip is extended on the inner wall of the radome such that a projected segment that results from the extension is intercepted substantially perpendicularly by said strip.

11. The method according to claim 10, wherein the lightning protection strip is connected to an electrical ground situated beyond the contour that delimits the lighting zone of the radome.

12. The method according to claim 9, wherein the multiple misalignments of the antenna encompass the entire radio slot of the antenna.

* * * * *